(No Model.)

J. F. BUTCHER.
WINDOW SCREEN FRAME.

No. 484,293. Patented Oct. 11, 1892.

WITNESSES
F. Clough.
D. W. Bradford

INVENTOR
John F. Butcher,
By Wells W. Leggett,
Attorney.

UNITED STATES PATENT OFFICE.

JOHN F. BUTCHER, OF FENTON, ASSIGNOR OF TWO-THIRDS TO GEORGE J. BUTCHER AND BIRT K. BOYD, OF MOUNT PLEASANT, MICHIGAN.

WINDOW-SCREEN FRAME.

SPECIFICATION forming part of Letters Patent No. 484,293, dated October 11, 1892.

Application filed March 16, 1891. Serial No. 385,239. (No model.)

*To all whom it may concern:*

Be it known that I, JOHN F. BUTCHER, a citizen of the United States, residing at Fenton, county of Genesee, State of Michigan, have invented a certain new and useful Improvement in Window-Screen Frames; and I declare the following to be a full, clear, and exact description of the same, such as will enable others skilled in the art to which it pertains to make and use the same, reference being had to the accompanying drawings, which form a part of this specification.

Figure 1:
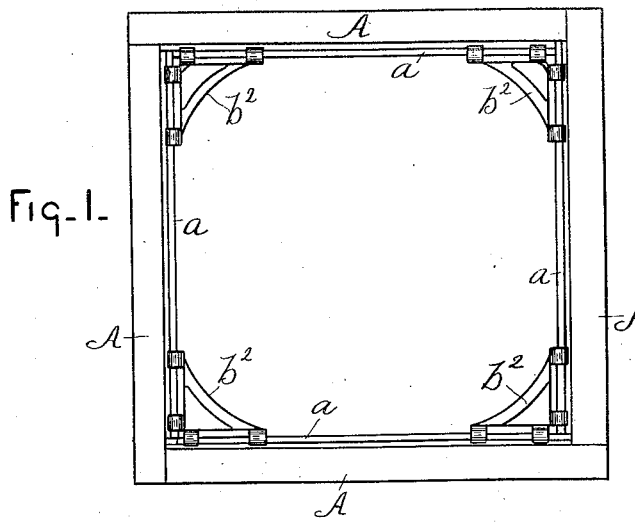
Figure 2:
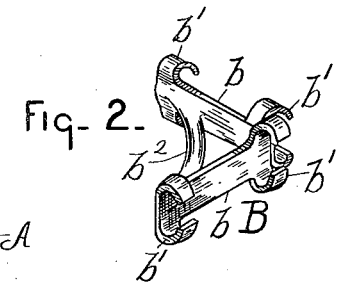
Figure 3:
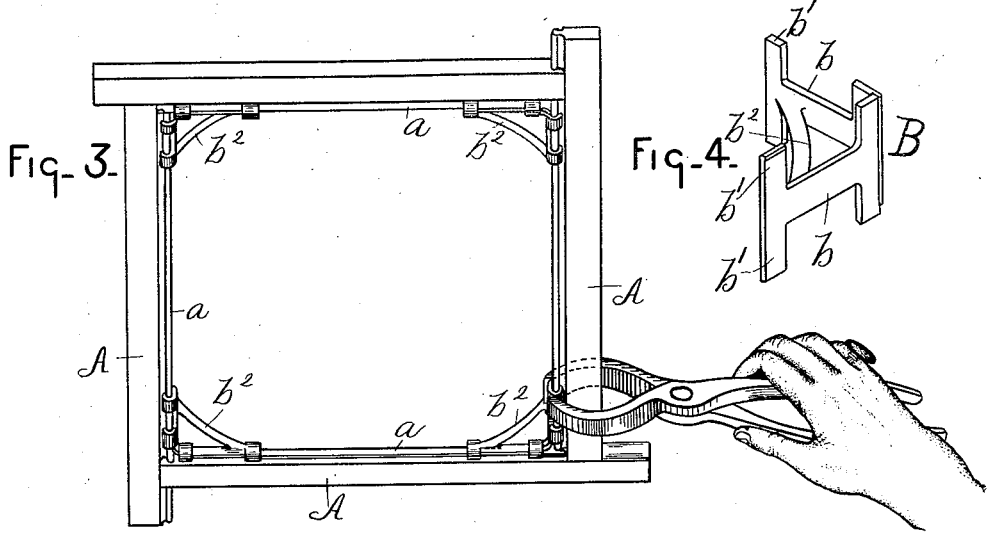
Figure 4:
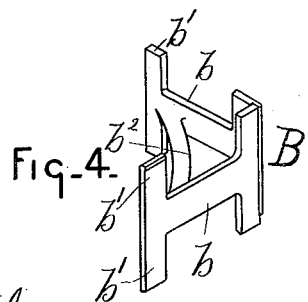
Figure 5:
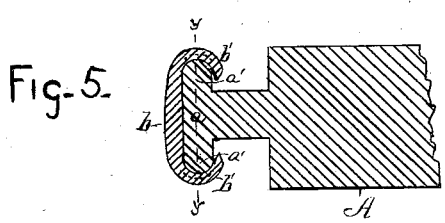
Figure 6:
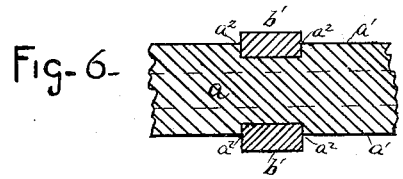

In the drawings, Figure 1 is a frame showing my invention. Fig. 2 is a view of corner-brace in shape to be placed on the frame. Fig. 3 is a perspective showing adjustability of frame and method of clinching corner-brackets to the frame. Fig. 4 is a view of corner-brace as cast in malleable iron before being formed, as shown in Fig. 2. Fig. 5 is a cross-sectional view through one end of the bracket and frame, and Fig. 6 is a transverse sectional view taken on line $y\ y$ of Fig. 5.

It is the purpose of my invention to provide a corner-bracket for a screen, the bracket being made of flexible material and adapted to be bent around the side pieces of the screen-frame or a tenon on the side pieces of the screen-frame and fastened to them by being clinched or bent in closely on the wood. By my construction the frame can be assembled, adjusted, and fastened in adjustment by the use of the corner-bracket alone and without nails or screws.

In carrying out my invention in the drawings, A represents the side bars of a frame, having a T-tenon $a$ formed on the inside. Each of these bars extend beyond and overlap the end of one of its adjoining bars. Each bar at the end where it is overlapped has a mortise in the overlapped end to accommodate the tenon of the overlapping bar. This mortise may be made to conform in shape to the tenon passing through it, and thus aid in supporting the frame, or it may be simply a section of the end of the bar cut away to allow the tenon to pass through.

B is a corner-bracket adapted to support the adjoining bars, and consists of the perpendicular sides $b\ b$, having formed on their edges the lugs $b'$. Preferably I make these brackets of malleable iron with the lugs when cast standing straight on a plane with the sides of the bracket, as shown in Fig. 4. The lugs can then be bent in the form shown in Fig. 2 by a suitable die, or they can be stamped out or made in any way desired, so as to take substantially the form shown in Fig. 2.

$b^2$ is a brace supporting the perpendicular sides of the bracket and may be, if preferred, made in the form of a web. When in the form shown in Fig. 2, the lugs are adapted to loosely embrace the tenon $a$ on the bars A and will slip freely up and down on it. I assemble the parts of the frame by engaging a corner-bracket with each one of the bars and engaging the several corners of the frame by slipping the tenon of the free overlapping end of each bar into the lugs of the bracket adjoining and into the mortise of the overlapping end. This permits a sliding adjustment, as shown in Fig. 3. When the desired size of frame is secured by the adjustment, the brackets are clinched with pinchers or other suitable tools adapted to bend the lugs closely about the tenon $a$, as shown in Figs. 3, 5, and 6. By clinching the lugs tight enough upon the tenon to indent it and form shoulders on the marginal tongues $a'\ a'$, as shown in dotted lines in Fig. 5 and by $a^2\ a^2$ in Fig. 6, the engagement of the sides or edges of the lugs with these shoulders will prevent the movement of the bracket upon the tenon, and thereby will always keep the frame and the screen tight or of the same size at which they were adjusted, which could not be done with a continuous flange without the aid of screws or other retaining devices which it is the object of this invention to avoid. These lugs may be provided with serrations or small auxiliary lugs on their inner faces to make them grip the frame more firmly, if desired, although I find the simple clinching of them sufficient to hold the frame rigid. If it is not desired to destroy the adjustability entirely, the lugs may be clinched, but not tight enough to embed them in the wood of the frame, after which further adjustment may be made by using some force. If, after having been once adjusted, the frame should become loosened, it may be again tightened by further clinching of the lugs with a hammer or pinchers, as convenient.

I am aware corner-pieces have been used, made of wood and adapted to engage a tenon formed on the inside of adjoining bars; but I am not aware that corner-brackets have been made adapted to clinch the tenon when the desired adjustment is attained or when a knockdown frame has been assembled. I am also aware that metal brackets have been used for supporting the corners of a window-frame having flanges adapted to embrace a tenon on the frame; but I am not aware that such a corner-bracket has ever been used in which lugs have been used in place of the flanges, whereby the brackets may be made to lock with a T-tenon for fastening an adjustable frame and may be employed to hold the frame in place during adjustment and before the lugs have been finally clinched into the framework. It is manifest that the lugs can be clinched into the wood much easier and that they will hold more firmly than a flange simply adapted to embrace the tenon and not provisioned to be clinched to it. My invention primarily consists in the use of flexible lugs in place of flanges and in further adapting the lugs to loosely embrace a T-tenon on the frame.

What I claim is—

A screen-frame constructed of four like bars, each provided with a T-shaped tenon along its inner edge, having marginal tongues $a'\ a'$ on the sides thereof and with a T-shaped mortise at one end for receiving and holding the tenon of the adjacent bar, said bars having, in combination therewith at each corner of the frame, a metallic bracket constructed with arms $b\ b$, each provided with narrow lugs $b'$ upon each side thereof and cut away therebetween; said lugs being bent around the marginal tongues of the adjacent bars and embedded thereinto, forming shoulders upon each side of said lugs, whereby the two adjacent bars of the frame are held immovably fastened together, the bars of the frame held immovable in one direction by the mortise-and-tenon engagement thereof at the corners of the frame, the bars being held immovable longitudinally thereof in the completed frame by the forcing of the lugs of said brackets into the tongues thereof, substantially as set forth.

In testimony whereof I sign this specification in the presence of two witnesses.

JOHN F. BUTCHER.

Witnesses:
 HENRY C. VARATT,
 JAS. I. BUTCHER.